(12) United States Patent
Sekizuka

(10) Patent No.: US 11,173,813 B2
(45) Date of Patent: Nov. 16, 2021

(54) VEHICLE SEAT

(71) Applicant: Toyota Jidosha Kabushiki Kaisha, Toyota (JP)

(72) Inventor: Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 16/653,022

(22) Filed: Oct. 15, 2019

(65) Prior Publication Data

US 2020/0122611 A1    Apr. 23, 2020

(30) Foreign Application Priority Data

Oct. 18, 2018 (JP) .............................. JP2018-196948

(51) Int. Cl.
| | |
|---|---|
| *B60N 2/42* | (2006.01) |
| *B60N 2/427* | (2006.01) |
| *B60N 2/16* | (2006.01) |
| *B60R 22/26* | (2006.01) |
| *B60N 2/02* | (2006.01) |
| *B60R 22/18* | (2006.01) |
| *A44B 11/25* | (2006.01) |

(52) U.S. Cl.
CPC ....... *B60N 2/42736* (2013.01); *B60N 2/0232* (2013.01); *B60N 2/164* (2013.01); *B60N 2/165* (2013.01); *B60N 2/1615* (2013.01); *B60N 2/1665* (2013.01); *B60N 2/4221* (2013.01); *B60R 22/26* (2013.01); *A44B 11/2561* (2013.01); *B60N 2/0276* (2013.01); *B60R 2022/1806* (2013.01)

(58) Field of Classification Search
CPC ............. B60N 2/42736; B60N 2/0232; B60N 2/1615; B60N 2/164; B60N 2/165; B60N 2/1665; B60N 2/4221; B60N 2/0276; B60R 22/26

See application file for complete search history.

(56) References Cited

U.S. PATENT DOCUMENTS

| | | | |
|---|---|---|---|
| 2011/0204684 A1* | 8/2011 | Forsman ................. | B60N 2/508 297/216.1 |
| 2011/0241400 A1* | 10/2011 | Ito ......................... | B60N 2/1615 297/311 |
| 2013/0241250 A1* | 9/2013 | Kuriyama ................ | B60N 2/43 297/216.1 |
| 2018/0022243 A1 | 1/2018 | Iyer et al. | |

FOREIGN PATENT DOCUMENTS

| | | |
|---|---|---|
| JP | H0360149 U | 6/1991 |
| JP | 2009-113642 A | 5/2009 |

\* cited by examiner

*Primary Examiner* — Syed A Islam
(74) *Attorney, Agent, or Firm* — Dinsmore & Shohl LLP

(57) ABSTRACT

A vehicle seat is provided with a wire that, in the event of a vehicle frontal collision, enables a pulling load applied by a vehicle occupant to a webbing to be transmitted between a cushion frame of a seat cushion and a movable rail of a sliding device. One end portion of the wire is anchored to a first anchoring member of the movable rail, while another end portion of the wire is anchored to a second anchoring member of the cushion frame.

5 Claims, 10 Drawing Sheets

VEHICLE SEAT

CROSS-REFERENCE TO RELATED APPLICATION

This application is based on and claims priority under 35 USC 119 from Japanese Patent Application No. 2018-196948 filed on Oct. 18, 2018, the disclosure of which is incorporated by reference herein.

BACKGROUND

Technical Field

The present disclosure relates to a vehicle seat.

Related Art

In a vehicle seat disclosed, for example, in Japanese Unexamined Patent Application (JP-A) No. 2009-113642, a buckle of a seatbelt device is attached to an upper portion frame that is lifted or lowered together with a seat frame by an operation of a suspension portion. Because of this, even if the suspension portion is operated after a webbing of the seatbelt device has been fitted around the body of a vehicle occupant, the buckle is lifted or lowered together with a seat cushion of the vehicle seat and with the body of the vehicle occupant who is sitting on that seat cushion. Because of this, in the above-described structure, any change in the up-down direction of the vehicle seat in the position of the buckle relative to the body of the vehicle occupant due to this lifting or lowering of the seat cushion is prevented, and any change or the like in the position where the webbing has been fitted on the body of the vehicle occupant can be prevented. In this way, by making it possible to prevent any change or the like in the position where the webbing has been fitted around the body of the vehicle occupant, any occurrence of a phenomenon known as a 'submarine phenomenon' in which the body of a vehicle occupant slides forwards so as to slip underneath the webbing in the event of a vehicle frontal collision or the like can be mitigated.

In the vehicle seat disclosed in JP-A No. 2009-113642, one end portion of a tether is anchored to the buckle of the seat belt device. Another end side of the tether is fixed to a fixing device provided at a vehicle floor at a position on a vehicle rear side of the vehicle seat. In the event of a vehicle collision, the webbing of the seatbelt device is pulled by the body of the vehicle occupant which starts to make an inertial movement towards the vehicle front side, and this causes the buckle to be pulled. The pulling force imparted to the buckle is transmitted via the tether to the fixing device, and is then transmitted via the fixing device to the vehicle body.

Here, in a structure such as this, because the fixing device is provided at a position on the vehicle floor on the vehicle rear side of the vehicle seat, if another seat is provided at the vehicle rear side of the vehicle seat, the comfort of a vehicle occupant occupying this other seat is impaired. Additionally, if the vehicle seat is capable of being moved in the vehicle front-rear directions, then the distance that the vehicle seat is movable towards the vehicle rear side is restricted. By providing the fixing device on the vehicle rear side of the vehicle seat in this way, it is difficult for a space on the vehicle rear side of the vehicle seat to be utilized effectively.

SUMMARY

The present disclosure provides a vehicle seat that enables a pulling load from a webbing that is transmitted to a buckle that is moved together with a seat main body by an operation of a lifting device to be transmitted to a vehicle body, and also enables a space on the vehicle rear side of the vehicle seat to be utilized effectively.

A vehicle seat according to a first aspect is provided with a seat main body configured to seat a vehicle occupant, a buckle that is joined to the seat main body, and that is configured to hold a tongue provided at a webbing of a seatbelt device, thereby effecting a state in which the webbing is fitted relative to a body of the vehicle occupant, a base member that is provided at a vehicle lower side of the seat main body, and that is joined to a vehicle body of a vehicle so as to be movable in a vehicle front-rear direction relative to the vehicle body, a lifting device that lifts the seat main body relative to the base member by moving the seat main body toward a front side of the vehicle relative to the base member, and a load transmitting member that is flexible, and that is joined to both the base member and the seat main body, and that becomes tensioned when the seat main body is placed in a lifted state by the lifting device.

According to the vehicle seat of the first aspect, in the event of a vehicle frontal collision, the body of a vehicle occupant who is sitting in a seat main body starts to make an inertial movement towards the vehicle front side. As a consequence of this, a webbing that has been fitted around the body of the vehicle occupant is pulled by the body of the vehicle occupant that is starting to make this inertial movement. A tongue provided at the webbing is held in a buckle, and this buckle is joined to the seat main body. Because of this, the pulling load acting on the webbing as a consequence of the webbing being pulled by the body of the vehicle occupant is transmitted to the seat main body via the tongue and the buckle, and the seat main body is made to move towards the vehicle front side relative to the base member. As a result of the seat main body being moved towards the vehicle front side in this way, the seat main body is placed in a lifted state relative to the base member in the same way as when the lifting device is operated.

When the seat main body is placed in a lifted state relative to the base member, and as a result of this, a load transmitting member becomes tensioned, the pulling load that is transmitted from the body of the vehicle occupant to the seat main body via the webbing, tongue, and buckle is transmitted to the base member by the pulling force generated as a result of the load transmitting member being placed in the tensioned state, and additionally, the pulling load can be transmitted via the base member to the vehicle body of the vehicle.

Here, the load transmitting member is joined to the seat main body and the base member. Because of this, there is no need to provide a structure that fixes the load transmitting member to the vehicle rear side of the seat main body and the base member.

A vehicle seat according to a second aspect is provided with a seat main body configured to seat a vehicle occupant, a buckle that is joined to the seat main body, and that is configured to hold a tongue provided at a webbing of a seatbelt device, thereby effecting a state in which the webbing is fitted relative to a body of the vehicle occupant, a base member that is provided at a vehicle lower side of the seat main body, a lifting device that lifts the seat main body relative to the base member by moving the seat main body toward a front side of the vehicle relative to the base member, a load transmitting member that is flexible, that is joined to one of the base member or the seat main body, and that becomes tensioned upon being pulled towards the other of the base member or the seat main body, and a pulling device having a movable member to which is jointed a different portion of the load transmitting member from a join portion that is joined to the one of the base member or the seat main body, the movable member being moved relative to the other of the seat main body or the base member as the result of being operated in the event of a vehicle frontal collision, and the movable member polling the load transmitting member, thereby tensioning the load transmitting member, as a result of moving relative to the other of the seat main body or the base member, the pulling device being joined to the other of the seat main body or the base member.

According to the vehicle seat of the second aspect, in the event of a vehicle frontal collision, the body of a vehicle occupant who is sitting in a seat main body starts to make an inertial movement towards the vehicle front side. As a consequence of this, a webbing that has been fitted around the body of the vehicle occupant is pulled by the body of the vehicle occupant that is starting to make this inertial movement. A tongue provided at the webbing is held in a buckle, and this buckle is joined to the seat main body. Because of this, the pulling load acting on the webbing as a consequence of the webbing being pulled by the body of the vehicle occupant is transmitted to the seat main body via the tongue and the buckle, and the seat main body is made to move towards the vehicle front side relative to the base member.

On the other hand, in the event of a vehicle frontal collision, a pulling device that is joined to another one of the seat main body and the base member is operated, and a movable member of the pulling device is moved relative to the other one of the seat main body and the base member. The load transmitting member is joined to the movable member, and the load transmitting member is joined to one of the seat main body and the vase member via a different portion thereof from the join portion thereof that is joined to the movable member.

The load transmitting member becomes tensioned as a result of the movable member being moved through the operation of the pulling device, and as a result of the load transmitting member being tensioned in this way, the pulling load that is transmitted from the body of the vehicle occupant to the seat main body via the webbing, tongue, and buckle is transmitted to the base member by the pulling force generated as a result of the load transmitting member being placed in a tensioned state, and additionally, the pulling load can be transmitted via the base member to the vehicle body of the vehicle.

Here, the load transmitting member is joined to the seat main body and the base member via the pulling device. Because of this, there is no need to provide a structure that fixes the load transmitting member to the vehicle rear side of the seat main body and the base member.

A vehicle seat of a third aspect is characterized in that, in the vehicle seat of the second aspect, the load transmitting member is a wire having one end portion that is joined to either the base member or the seat main body, and the pulling device comprises a cylinder having a piston which serves as the movable member and with which another end portion of the wire is engaged, and a mounting portion at which is mounted a micro gas generator, the mounting portion being connected to an inner side of the cylinder, and the piston is moved by gas that is supplied to the inner side of the cylinder as a result of the micro gas generator being operated.

A vehicle seat of a fourth aspect is characterized in that, in the vehicle seat of the second aspect, the load transmitting member is a wire having one end portion that is joined to either the base member or the seat main body, and the pulling device has a guide case, a slider serving as a movable member that is provided at an inner side of the guide case, and with which the other end portion of the wire is engaged, and in which a screw hole is provided, a guide screw that is provided at an inner side of the guide case and screws into the screw hole, and a motor actuator to which the guide screw is joined, and the slider is moved by drive force from the motor actuator.

A vehicle seat of a fifth aspect is characterized in that, in the vehicle seat of the second aspect, the load transmitting member is a wire having one end portion that is joined to either the base member or the seat main body, and the pulling device comprises a cylinder having a piston which serves as the movable member and with which another end portion of the wire is engaged, and a tension coil spring having one end that is anchored to the piston, and the piston is moved by biasing force from the tension coil spring.

A vehicle seat according to a sixth aspect is characterized in that, in the vehicle seat according to any one of the first through fifth aspects, a join portion, at which the load transmitting member is joined to at least one of the seat main body or the base member, is rotatable relative to a side at which the seat main body or the base member is joined.

According to the vehicle seat of the sixth aspect, the join portion at which the load transmitting member is joined to at least one of the seat main body or the base member, is rotatable relative to the side at which the seat main body or the base member is joined. Because of this, when the direction of the load that is applied to the load transferring member is not the same direction as a direction of a straight line connecting the join portion on the seat main body side of the load transmitting member to the join portion on the base member side of the load transmitting member, the join portion where the load transmitting member is joined to at least one of the seat main body or the base member is rotatable relative to the side where the seat main body or the base member is joined. As a result, the direction of the load that is imparted to the load transferring member is set to the same direction as the direction of a straight line connecting the join portion on the seat main body side of the load transmitting member to the join portion on the base member side of the load transmitting member. As a result, the load transmitting member can be smoothly placed in a state of tension.

A vehicle seat of a seventh aspect is provided with a seat main body configured to seat a vehicle occupant, a buckle that is joined to the seat main body, and that is configured to hold a tongue provided at a webbing of a seatbelt device, thereby effecting a state in which the webbing is fitted relative to a body of the vehicle occupant, a base member that is provided at a vehicle lower side of the seat main body, and that is joined to a vehicle body of a vehicle so as to be movable in a vehicle front-rear direction relative to the vehicle body, a lifting device that lifts the seat main body relative to the base member by moving the seat main body toward a rear side of the vehicle relative to the base member, and a load transmitting member that is joined to the base member, and that includes a load-receiving portion having a shape emulating a movement trajectory of the buckle when the buckle is moved by the lifting device, the load-receiving portion being disposed so as to face a predetermined portion at a vehicle front side of the buckle, and a load generated when the buckle is moved towards the vehicle front side being received by the load-receiving portion and transmitted to the base member.

According to the vehicle seat of the seventh aspect, in the event of a vehicle frontal collision, the body of a vehicle occupant who is sitting in a seat main body starts to make an inertial movement towards the vehicle front side. As a consequence of this, a webbing that has been fitted around the body of the vehicle occupant is pulled by the body of the vehicle occupant that is starting to make this inertial movement. A tongue provided at the webbing is held in a buckle, and this buckle is joined to the seat main body.

Because of this, the pulling load acting on the webbing as a consequence of the webbing being pulled by the body of the vehicle occupant is transmitted from the tongue to the buckle, and the buckle is made to move towards the vehicle front side relative to the base member. When the buckle is moved towards the vehicle front side in this way, a predetermined portion of the buckle abuts against a load-receiving portion of the load transmitting member, and this load-receiving portion receives the pulling load transmitted to the buckle. Because the load transmitting member is joined to the base member, the load received by the load-receiving portion is transmitted to the base member, and additionally, the load can be transmitted via the base member to the vehicle body of the vehicle.

Here, the load transmitting member is joined to the base member. Because of this, there is no need to provide a structure that fixes the load transmitting member to the vehicle rear side of the seat main body and the base member.

A vehicle seat of an eighth aspect is characterized in that, in the vehicle seat of the seventh aspect, an opening is formed in the load transmitting member, the predetermined portion of the buckle is configured to be inserted into the opening, and an inner side surface of the opening forms the load-receiving portion.

According to the vehicle seat of the eighth aspect, the opening into which the predetermined portion of the buckle is inserted, is formed in the load transmitting member, and an inner side surface of the opening forms the load-receiving portion that receives a load from the buckle. Because the load-receiving portion is formed by the inner side surface of the opening in this way, the load transmitting member has a portion located on the opposite of the opening from the load-receiving portion, and this portion on the opposite side from the load-receiving portion is connected with the load-receiving portion. Because of this, it is possible to prevent the load-receiving portion from being deformed by the pulling load when the load-receiving portion receives a pulling load from the buckle.

A vehicle seat of a ninth aspect is characterized in that, in the vehicle seat of the seventh aspect, the load transmitting member comprises a plate, and an end portion on a vehicle rear side of the plate forms the load-receiving portion.

A vehicle seat of a tenth aspect is characterized in that, in the vehicle seat of any one of the first through ninth aspects, the lifting device comprises a lift motor, a pinion that is joined to an output shaft of the lift motor, a driving link that is supported so as to be freely rotatable on the seat main body and the base member and at which is formed a sector gear that meshes with the pinion, and a driven link that is supported so as to be freely rotatable on the seat main body and the base member and that is rotated subserviently to the driving link.

In the vehicle seat disclosed in each one of the first through fifth aspects, the seventh aspect, and the tenth aspect, there is no need to provide a structure that fixes the load transmitting member to the vehicle rear side of the seat main body and the base member, so that the space on the vehicle rear side of the seat main body and the base member can be utilized effectively.

In the vehicle seat of the sixth aspect, the load transmitting member can be smoothly placed in a state of tension.

In the vehicle seat of the eighth and ninth aspects, because it is possible to prevent the load-receiving portion of the load transmitting member from being deformed by a pulling load received from a predetermined portion of the buckle, the pulling load can be transmitted efficiently to the base member.

BRIEF DESCRIPTION OF THE DRAWINGS

Exemplary embodiments of the present disclosure will be described in detail based on the following figures, wherein.

DETAILED DESCRIPTION

Hereinafter, respective exemplary embodiments of the present disclosure will be described based on FIG. 1 through FIG. 11. Note that an arrow FR and an arrow UP that are shown in the appropriate drawings respectively indicate a front side (i.e., a vehicle front side) of a vehicle seat 10 and a vehicle upper side thereof.

Moreover, in the following descriptions of the respective exemplary embodiments, member elements being described in a particular exemplary embodiment that are fundamentally the same as those described in a previous exemplary embodiment are given the same descriptive symbols, and a detailed description thereof is omitted.

Structure of a First Exemplary Embodiment

Figure 1:
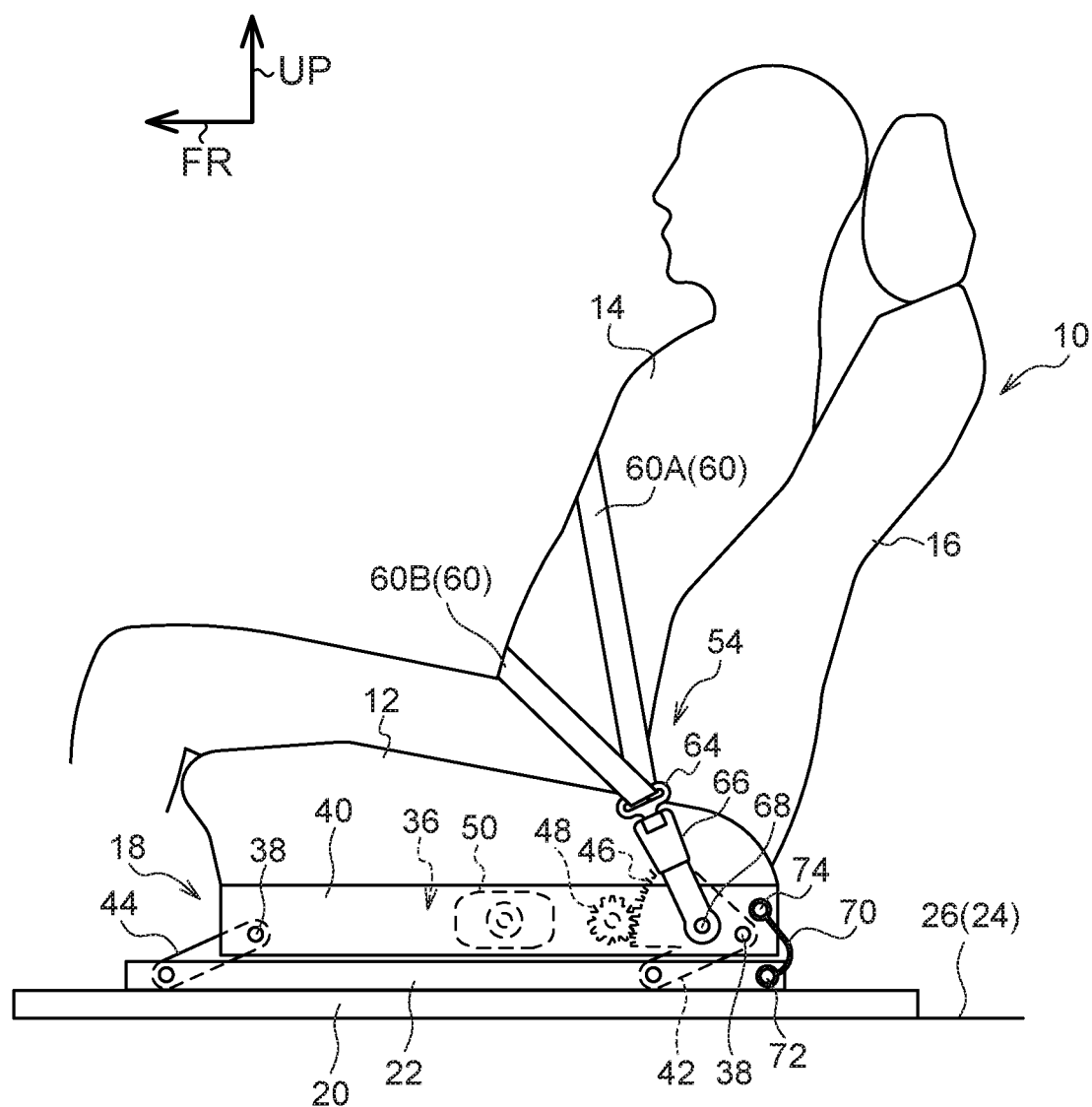
FIG. 1 is a side view of a vehicle seat according to a first exemplary embodiment.
Figure 2:
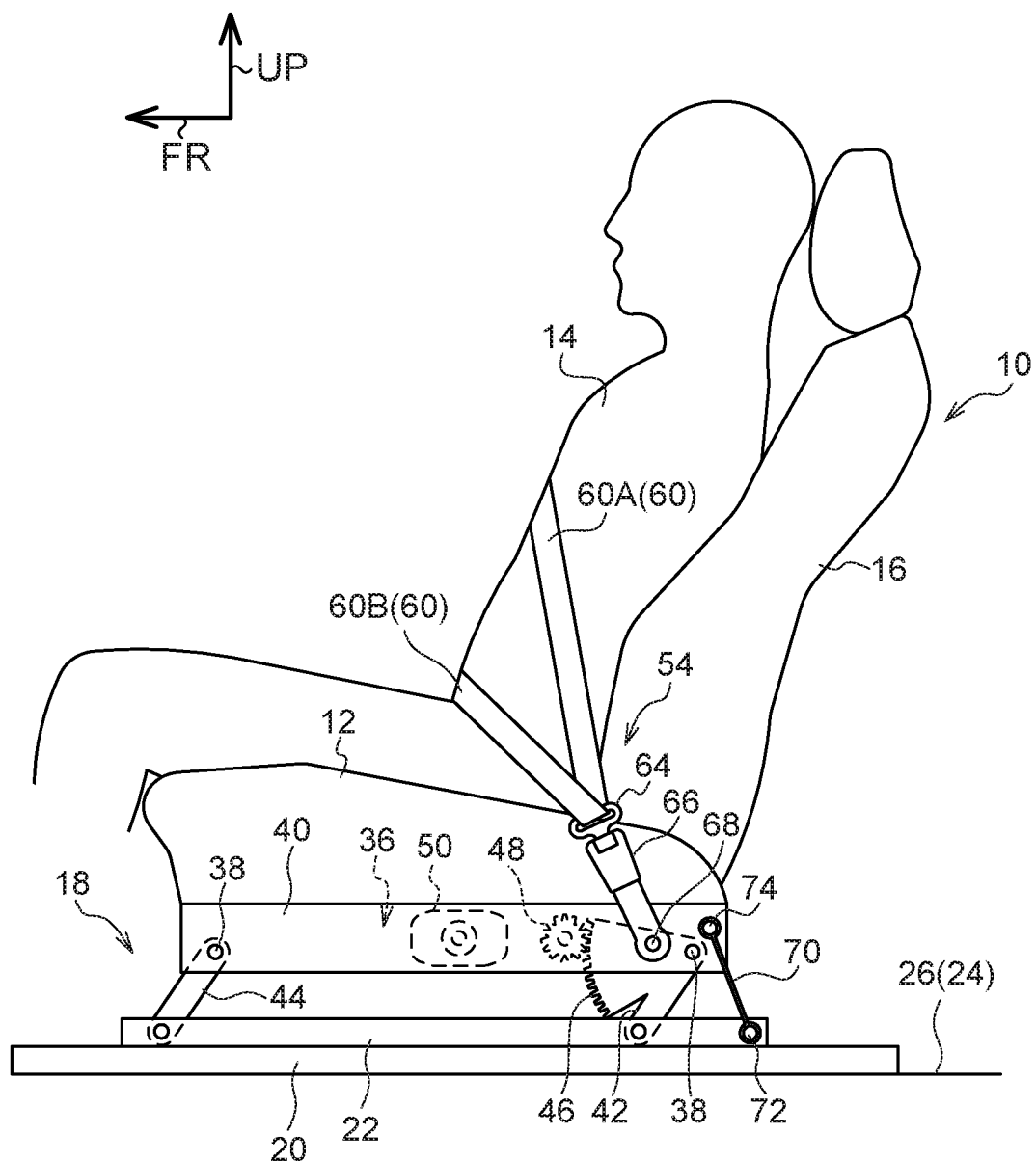
FIG. 2 is a side view corresponding to FIG. 1 showing a state in which a seat cushion has been lifted to a maximum lift position by a lifting device.

As is shown in FIG. 1, a vehicle seat 10 according to a first exemplary embodiment is provided with a seat cushion 12 that serves as a seating portion and forms part of a seat main body, and a seat back 16 that serves as a backrest and forms part of the seat main body is provided at a vehicle rear side of the seat cushion. A shaft portion (not shown in the drawings) that is elongated in the seat width direction is provided at the vehicle lower side of the seat back 16, and the seat back 16 is able to pivot in the vehicle front and rear directions relative to the seat cushion 12 around this shaft portion.

In addition, the vehicle seat 10 is provided with a sliding device 18. The sliding device 18 is provided with a pair of guide rails 20. A longitudinal direction of these guide rails 20 extends in the vehicle front-rear direction (i.e., in a direction shown by an arrow FR in FIG. 1*i*, as well as in the opposite direction thereto). These guide rails 20 are fixed to a floor 26 which serves as a vehicle body of a vehicle 24 on a vehicle lower side of end portions on both sides in a seat width direction of the seat cushion 12. The sliding device 18 is additionally provided with a pair of movable rails 22 which serve as base members. A longitudinal direction of these movable rails 22 extends in the vehicle front-rear direction. These movable rails 22 are provided at a vehicle lower side of end portions on both sides in the seat width direction of the seat cushion 12. The movable rails 22 are engaged with the guide rails 20, and the movable rails 22 are able to slide in the vehicle front-rear direction while being guided by the guide rails 20.

Figure 3:
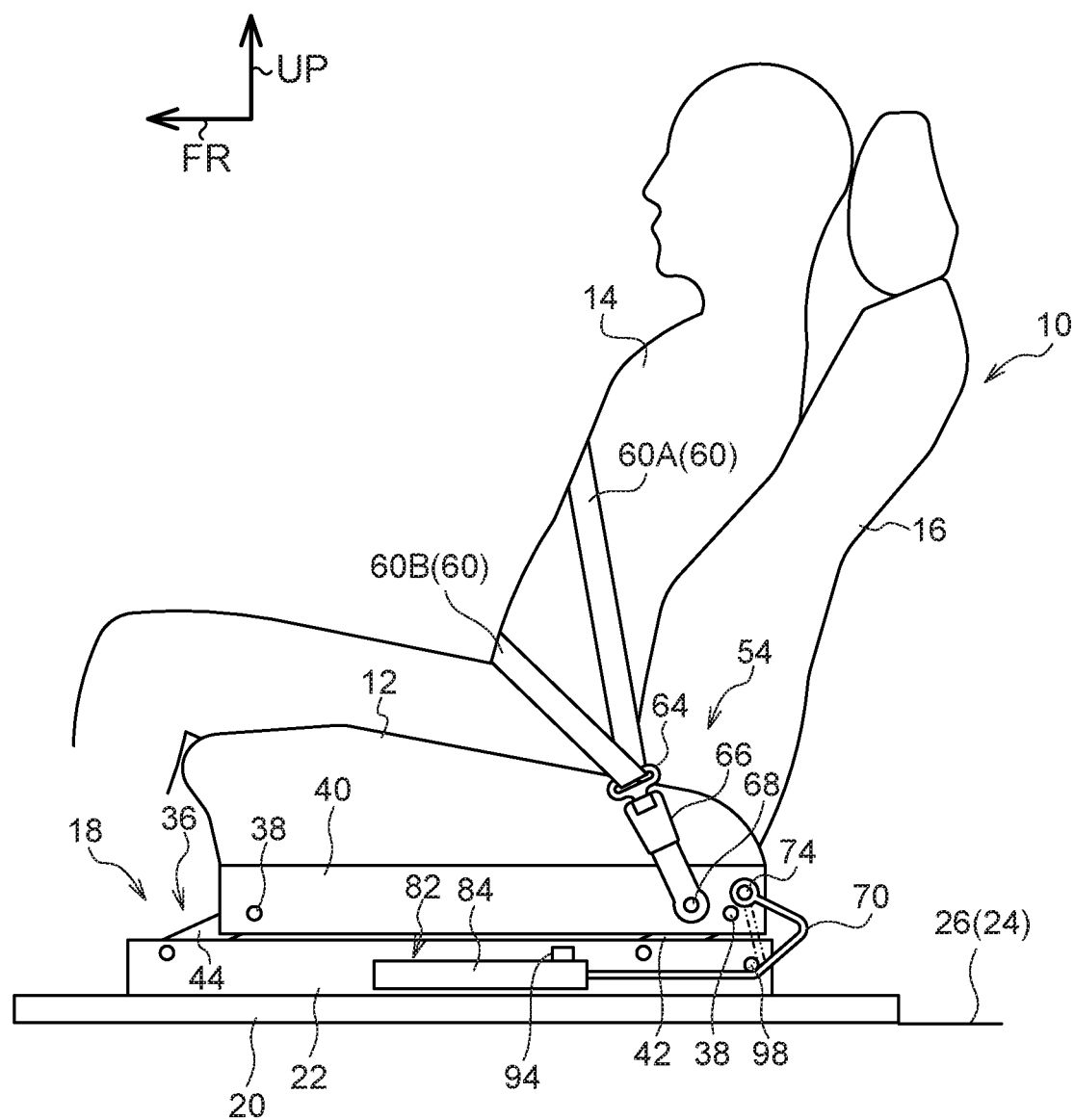
FIG. 3 is a side view of a vehicle seat according to a second exemplary embodiment.

Moreover, as is shown in FIG. 3, the sliding device 18 is provided with a slide motor (not shown in the drawings). The slide motor may be provided, for example, between the pair of movable rails 22, and the movable rails 22 are moved in the vehicle front-rear directions by drive force from the slide motor that is output as a result of a slide switch being operated.

Moreover, as is shown in FIG. 1, the vehicle seat 10 is also provided with a lifting device 36. The lifting device 36 is provided with a pair of rods 38. One of this pair of rods 38 is provided at the vehicle rear side of a cushion frame 40 of the seat cushion 12, while another rod 38 is provided at the vehicle front side of the cushion frame 40. A longitudinal direction of the rods 38 extends in the seat width direction, and both end portions in the longitudinal direction of each rod 38 are supported on the cushion frame 40.

The lifting device 36 is also provided with a driving link 42 which serves as a lifting/lowering member, and with three driven links 44. The driving link 42 is provided at a rear left-side in the vehicle width direction of the cushion frame 40, and one end portion in a longitudinal direction of the driving link 42 is supported by the rod 38 provided at the vehicle rear side of the cushion frame 40 so as to be freely rotatable around this rod 38. One of the three driven links 44 is provided at the front left-side in the vehicle width direction of the cushion frame 40, and is supported by the rod 38 provided at the vehicle front side of the cushion frame 40 so as to be freely rotatable around this rod 38. Other end portions in the longitudinal direction of each one of the driving link 42 and the driven link 44 which are on the left side in the vehicle width direction are joined to the movable rail 22 which is located on the left side in the vehicle width direction out of the pair of movable rails 22, and these other end portions are able to pivot relative to the movable rail 22 on the left side in the vehicle width direction around a shaft whose axial direction extends in the seat width direction.

The remaining two of the three driven links 44 are provided respectively on the front right-side in the vehicle width direction, and on the rear right-side in the vehicle width direction of the cushion frame 40. The driven link 44 on the rear right-side in the vehicle width direction of the cushion frame 40 is rotatably supported by the vehicle rear-side rod 38, while the driven link 44 on the front right-side in the vehicle width direction of the cushion frame 40 is rotatably supported by the vehicle front-side rod 38. Other end portions in the longitudinal direction of each one of these driven links 44 which are on the right side in the vehicle width direction are joined to the movable rail 22 which is located on the right side in the vehicle width direction out of the pair of movable rails 22, and these other end portions are able to pivot relative to the movable rail 22 on the right side in the vehicle width direction around a shaft whose axial direction extends in the seat width direction.

In addition, a sector gear 46 is formed on the above-described driving link 42. External teeth are formed on a vehicle front-side end of the sector gear 46, and the sector gear 46 forms a portion of an external tooth spur gear that is coaxial with the vehicle rear-side rod 38. The pinion 48 meshes with this sector gear 46. When the rotation of the pinion 48 is transmitted to the sector gear 46, the driving link 42 is pivoted around a join portion between the driving link 42 and the movable rail 22.

When, as a result of this pivoting of the driving link 42, the vehicle rear-side rod 38 is pivoted towards the vehicle front-upper side, the cushion frame 40 is also pivoted towards the vehicle front-upper side so that the seat cushion is lifted. In contrast to this, when, as a result of the pivoting of the driving link 42, the vehicle rear-side rod 38 is pivoted towards the vehicle lower rear side, the cushion frame 40 of the seat cushion 12 is also pivoted towards the vehicle lower rear side so that the seat cushion is lowered down. Furthermore, in conjunction with this lifting and lowering of the cushion frame 40, the above-described three driven links 44 are pivoted by being passively driven so as to pivot around the join portions where they are joined to the movable rails 22. The above-described pinion 48 is joined to an output shaft of a lift motor 50 via a speed reduction mechanism such as a reduction gear train, or via a drive force transmission mechanism, and the pinion 48 is rotated by drive force from the lift motor 50 which is output as a result of the lift switch being operated.

A buckle 66 of a seatbelt device 54 is provided at a left side in the vehicle width direction of the seat cushion 12. The buckle 66 is attached to the cushion frame 40 of the seat cushion 12 by a fastening member 68 such as a bolt or the like. Because of this, when the seat cushion 12 is lifted or lowered by drive force from the lift motor 50 of the lifting device 36, the buckle 66 is also lifted or lowered together with the seat cushion 12. A tongue 64 provided at webbing 60 of the seatbelt device 54 is able to be engaged with the buckle 66, and when the tongue 64 is engaged with the buckle 66, the tongue 64 is held by the buckle 66. As a result of the tongue 64 being held by the buckle 66 after the webbing 60 has been fitted around the body of a vehicle occupant 14, the body of the vehicle occupant 14 is in a state of being restrained by the webbing 60.

In this restrained state, a portion of the webbing 60 on one side of the tongue 64 forms a shoulder webbing 60A, and a portion extending from a shoulder on the outer side in the vehicle width direction to the vicinity of the chest portion of the body of the vehicle occupant 14 is restrained by the shoulder webbing 60A. On the other hand, in the restrained state, a portion of the webbing 60 on another side of the tongue 64 forms a lap webbing 60B. The lap webbing 60B restrains a waist portion of the body of the vehicle occupant 14 from the vehicle front-upper side.

In addition, this vehicle seat 10 is provided with a wire 70 which serves as a load transmitting member. The wire 70 is provided at the left side in the vehicle width direction of the cushion frame 40 of the seat cushion 12. A first anchoring member 72 is provided at an end portion on the vehicle rear side of the movable rail 22 on the vehicle left side of the sliding device 18. The first anchoring member 72 is formed by a fastening member such as, for example, a bolt or the like, and an axial direction of the first anchoring member 72 extends roughly in the vehicle width direction. One end portion of the wire 70 is formed in a ring shape. This one end portion of the wire 70 is looped around the first anchoring member 72, so that the one end portion of the wire 70 is able to pivot relative to the first anchoring member 72 around an axis whose axial direction extends in the vehicle width direction.

In contrast to this, a second anchoring member 74 is provided at an end portion on the vehicle rear side on the left-side surface in the vehicle width direction of the cushion frame 40 of the seat cushion 12. The second anchoring member 74 is formed by a fastening member such as, for example, a bolt or the like, and an axial direction of the second anchoring member 74 extends roughly in the vehicle width direction. Another end portion of the wire 70 is formed in a ring shape. This other end portion of the wire 70 is looped around the second anchoring member 74, so that the other end portion of the wire 70 is able to pivot relative to the second anchoring member 74 around an axis whose axial direction extends in the vehicle width direction. The length of the wire 70 is set such that, when the seat cushion 12 has reached a maximum lift position to which it can be lifted towards the vehicle upper side by the lifting device 36, the wire 70 is pulled into a straight line.

Action and Effects of the First Exemplary Embodiment

Next, an action and effects of the present exemplary embodiment will be described.

In the present vehicle seat 10, in the event the vehicle 24 is in a frontal collision, the body of the vehicle occupant 14 starts to make an inertial movement towards the vehicle front side. As a result of this, the webbing 60 of the seatbelt device 54 which has been fitted around the body of the vehicle occupant 14 is pulled against the body of the vehicle occupant 14. The tongue 64 provided at the webbing 60 is held in the buckle 66, and the buckle 66 is attached to the cushion frame by the fastening member 68. Because of this, the pulling load exerted on the webbing 60 by the body of the vehicle occupant 14 is transmitted to the cushion frame 40 via the tongue 64 and the buckle 66, and the cushion frame 40 starts to move towards the vehicle front side due to the transmitted pulling load.

The cushion frame 40 and the sliding device 18 are joined together by the driving link 42 and the driven links 44 of the lifting device 36. Because of this, if the seat cushion 12 has not been moved to the maximum lift position to which it can be lifted towards the vehicle upper side by the lifting device 36, the cushion frame 40 is moved towards the vehicle front side by the transmitted pulling load, and the driving link 42 and the driven links 44 are pivoted, and as a result of this, the cushion frame 40 is pivoted towards the vehicle upper side. When the cushion frame 40 reaches the maximum lift position to which it can be lifted towards the vehicle upper side by the lifting device 36, the wire 70 is pulled into a straight line.

In this state, the pulling load that is transmitted from the vehicle occupant 14 to the webbing 60 is transmitted to the movable rail 22 of the sliding device 18 via the tongue 64, the buckle 66, the cushion frame 40, and the wire 70. Furthermore, the pulling load that is transmitted in this way to the movable rail 22 is then transmitted to the floor 26 of the vehicle 24 via the guide rails 20 of the sliding device 18. Because the pulling load that is applied to the webbing 60 as a result of the vehicle occupant 14 starting to make an inertial movement towards the vehicle front side can be transmitted in this way to the floor 26 of the vehicle 24, it is possible to prevent the vehicle seat 10 from being deformed by this type of pulling load, and making any large movement towards the vehicle front side.

Moreover, in the present exemplary embodiment, one end portion of the wire 70 is looped around the first anchoring member 72 of the guide rail 22 on the left side in the vehicle width direction, while the other end portion of the wire 70 is looped around the second anchoring member 74 of the cushion frame 40. Because of this, there is no need to provide a structure for anchoring the end portions of the wire 70 in the space on the vehicle rear side of this vehicle seat 10. Consequently, the space on the vehicle rear side of this vehicle seat 10 can be put to better practical use.

Furthermore, in the present exemplary embodiment, one end portion of the wire 70 is formed in a ring shape, and is looped around the first anchoring member 72 so as to be rotatable around this first anchoring member 72, while the other end portion of the wire 70 is formed in a ring shape, and is looped around the second anchoring member 74 so as to be rotatable around this second anchoring member 74. Because of this, when the wire 70 is pulled taut, at least one end portion in the longitudinal direction of the wire 70 is suitably rotatable around at least one of the first anchoring member 72 or the second anchoring member 74 in accordance with the direction of the pulling force. As a result, when the cushion frame 40 reaches the maximum lift position to which it can be lifted by the lifting device 36, the wire 70 is pulled smoothly into a straight line, and the load can be smoothly transmitted from the cushion frame 40 to the movable rails 22.

Second Exemplary Embodiment

As is shown in FIG. 3, the vehicle seat 10 according to a second exemplary embodiment is formed by adding a pulling device 82 to the vehicle seat 10 according to the first exemplary embodiment. Other than the pulling device 82, the remainder of the structure is basically the same as that of the vehicle seat 10 according to the first exemplary embodiment. Accordingly, in the description of the present exemplary embodiment, member elements that are the same as in the first exemplary embodiment are given the same descriptive symbols and a detailed description thereof is omitted.

Figure 4:
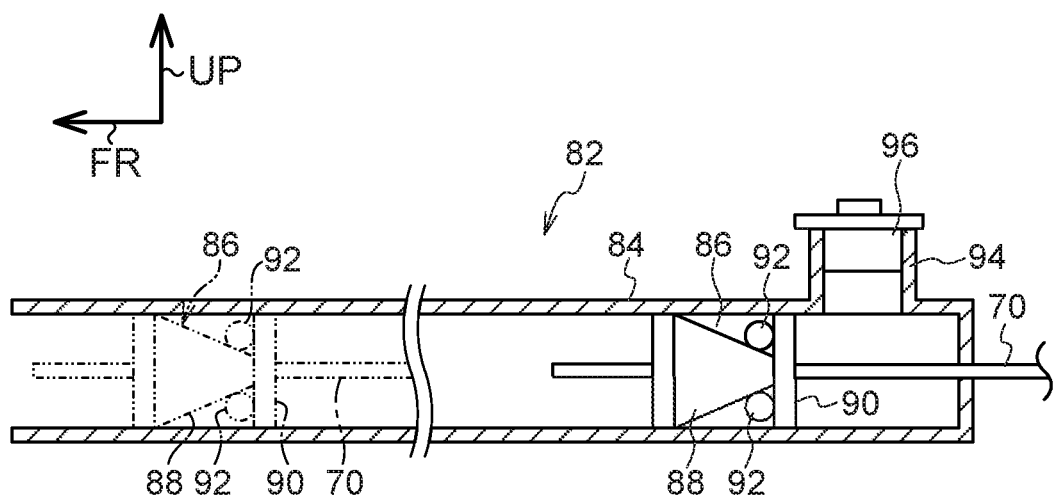
FIG. 4 is a side cross-sectional view showing a pulling device of a vehicle seat according to the second exemplary embodiment.

As is shown in FIG. 4, the pulling device 82 is provided with a cylinder 84. An axial direction of the cylinder 84 extends roughly in the vehicle front-rear direction, and a piston 86 which serves as a movable member is provided at an inner side of the cylinder 84. The piston 86 is provided with a piston main body 88. The piston main body 88 is formed in a substantially conical shape such that an outer diameter dimension thereof becomes progressively smaller approaching the vehicle rear side. A piston flange portion 90 is formed on an end portion on the vehicle rear side of the piston main body 88.

In addition, stoppers 92 are provided at the piston 86. The stoppers 92 are formed in a spherical shape, and are placed on an outer side of an outer circumferential surface of the cone shape of the piston main body 88 on the vehicle front side of the piston flange portion 90. When the piston 86 is moved towards the vehicle front side, the stoppers 92 are pressed by the piston flange portion 90, and are moved towards the vehicle rear side together with the piston 86. On the other hand, if the piston 86 is moved towards the vehicle rear side at a speed equal to or greater than a predetermined value, the stoppers 92 are unable to follow this movement of the piston 86, and are moved relative to the piston 86 towards the vehicle rear side. As a result of this relative movement of the stoppers 92 relative to the piston 86, the stoppers 92 are sandwiched between the outer circumferential surface of the cone shape of the piston 86 and the inner circumferential surface of the cylinder 84. Movement of the piston 86 towards the vehicle rear side is restricted by this elastic deformation of the stoppers 92.

Moreover, a mounting portion 94 is formed on a vehicle upper side of the cylinder 84 at a vehicle rear-side end portion of the cylinder 84, and a micro gas generator 96 (hereinafter, the micro gas generator 96 is abbreviated to 'MGG 96') is mounted on the mounting portion 94. When operated, the MGG 96 instantly generates gas on the inner side of the mounting portion 94. This inner side of the mounting portion 94 is connected to the inner side of the cylinder 84. Because of this, the gas generated by the MGG 96 is supplied to the inner side of the cylinder 84, and the piston 86 is moved by the pressure of this gas towards the vehicle front side.

In addition, one end portion of the wire 70 is anchored to the piston 86. Because of this, when the piston 86 is moved towards the vehicle front side, the wire 70 is pulled towards the one end portion side. As is shown in FIG. 3, an intermediate portion in the longitudinal direction of the wire 70 is supported on a wire supporting portion 98. The wire supporting portion 98 is provided at the movable rail 22 on the vehicle left side of the sliding device 18. The intermediate portion in the longitudinal direction of the wire 70 is drawn around an axle portion of the wire supporting portion 98. A retaining flange is formed on the wire supporting portion 98 on the opposite side from the movable rail 22 so that the wire 70 is sandwiched between them. Movement of the wire 70 in an axial direction of the wire supporting portion 98, namely, in the vehicle width direction is prevented by the movable rail 22 and the retaining flange, so that the wire 70 is prevented from coming free from the wire supporting portion 98.

The length of the wire 70 is set such that, when the piston 86 is positioned in its initial position inside the cylinder 84, the wire 70 is pulled as a result of the seat cushion 12 reaching a maximum lift position to which it can be lifted towards the vehicle upper side by the lifting device 36. Because of this, as is shown by the solid line in FIG. 3, when the piston 86 is positioned in its initial position inside the cylinder 84, then when the seat cushion 12 has been lowered as far as possible towards the vehicle lower side by the lifting device 36, the wire 70 is slack.

In the present vehicle seat 10, when the vehicle 24 is in a frontal collision, the MGG 96 is operated. As a consequence, the gas generated by the MGG 96 is supplied to the inner side of the cylinder 84 and, as is shown by the double-dot chain line in FIG. 4, the piston 86 inside the cylinder 84 is moved towards the vehicle front side by the pressure of this gas. As a consequence, the end portion on the piston 86 side of the wire 70 is moved towards the vehicle front side. In this state, if, for example, the seat cushion 12 has been lowered as far as possible towards the vehicle lower side by the lifting device 36, then the wire 70 is pulled as a result of it being pulled by the piston 86 (i.e., in the state shown by the double-dot chain line in FIG. 3).

In a state in which the wire 70 is being pulled in this way, the pulling load applied to the webbing 60 of the seatbelt device 54 from the body of the vehicle occupant 14 which is starting to make an inertial movement towards the vehicle front side is transmitted to the piston 86 of the pulling device 82 via the tongue 64, the buckle 66, the cushion frame 40 and the wire 70. As a result, when the piston 86 starts to move towards the vehicle rear side, the stoppers 92 perform a relative movement relative to the piston 86, and as a result of this, the stoppers 92 become sandwiched between the conical outer circumferential surface of the piston 86 and the inner circumferential surface of the cylinder.

In this way, as a result of the stoppers 92 being sandwiched between the outer circumferential surface of the piston 86 and the inner circumferential surface of the cylinder 84, movement of the piston towards the vehicle rear side is restricted, and as a result of this, the pulling load transmitted from the wire 70 to the piston 86 is transmitted to the cylinder 84. The pulling load that is transmitted to the cylinder 84 in this way is transmitted to the movable rail 22 on the vehicle left side of the sliding device 18, and is then transmitted from this movable rail 22 to the floor 26 of the vehicle 24 via the guide rails 20.

Because the pulling load applied to the webbing 60 as a result of the vehicle occupant 14 starting to make an inertial movement towards the vehicle front side is transmitted in this way to the floor 26 of the vehicle 24, it is possible to prevent the vehicle seat 10 from being deformned by this type of pulling load, and making any large movement towards the vehicle front side.

In addition, the wire 70 can be pulled taut by the operation of the pulling device 82 without the seat cushion 12 reaching the maximum lift position. Because of this, the above-described pulling load can be transmitted to the floor 26 of the vehicle 24 within a very short time after the vehicle 24 has collided with an object.

Furthermore, in the present exemplary embodiment, one end portion of the wire 70 is supported by the wire supporting portion 98 of the movable guide rail 22 on the left side in the vehicle width direction, and the other end portion of the wire 70 is looped around the second anchoring member 74 of the cushion frame 40 of the seat cushion 12. Because of this, there is no need to provide a structure for anchoring the end portions of the wire 70 in the space on the vehicle rear side of this vehicle seat 10. Consequently, the space on the vehicle rear side of this vehicle seat 10 can be put to better practical use.

Third Exemplary Embodiment

Figure 5:
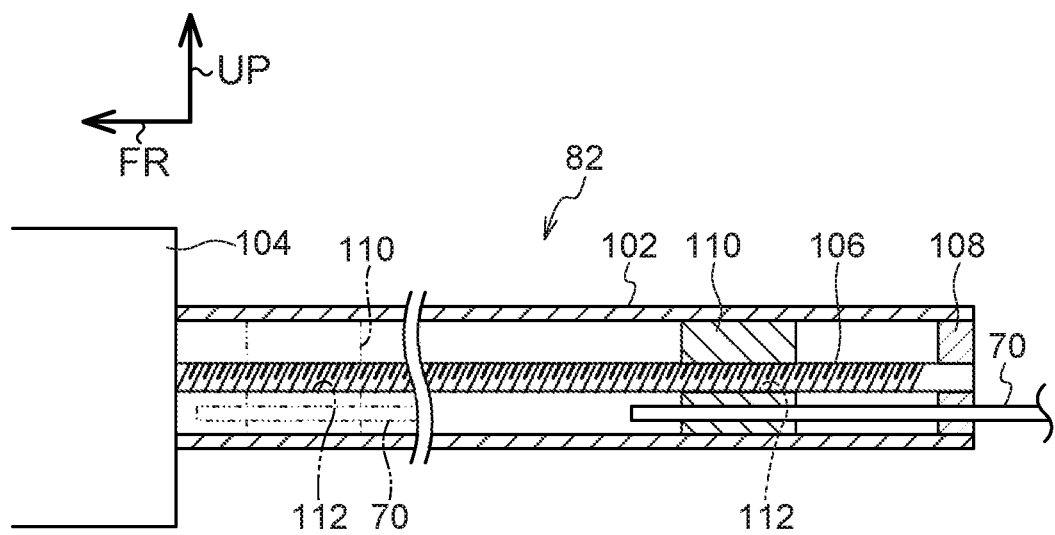
FIG. 5 is a side cross-sectional view showing a pulling device of a vehicle seat according to a third exemplary embodiment.

As is shown in FIG. 5, the pulling device 82 of the vehicle seat 10 according to a third exemplary embodiment is provided with a cylindrical guide case 102. A longitudinal direction of this guide case 102 extends roughly in the vehicle front-rear direction, and a cross-sectional configuration of an inner circumferential portion of the guide case 102 cut across an orthogonal direction relative to the longitudinal direction of the guide case 102 is formed in a rectangular shape. A motor actuator 104 is provided at a vehicle front side of the guide case 102.

In addition, a guide screw 106 is provided at an inner side of the guide case 102. A longitudinal direction of this guide screw 106 extends roughly in the vehicle front-rear direction, and an end portion on the vehicle rear side of the guide screw 106 is supported so as to be freely rotatable by a shaft receiving portion 108 provided inside the guide case 102. In contrast to this, an end portion on the vehicle front side of the guide screw 106 is joined to an output shaft of the motor actuator 104, and the guide screw 106 is rotated around a central axis of the guide screw 106 by drive force from the motor actuator 104.

Furthermore, a slider 110 which is serving as a movable member is provided at an inner side of the guide case 102. An outer circumferential configuration of the slider 110 is formed in the same rectangular shape as the inner circumferential configuration of the guide case 102, and a rotation of the slider 110 in a rotational direction around an axis which matches the longitudinal direction of the guide case 102 is restricted by the guide case 102. A screw hole 112 through which is inserted the guide screw 106 is formed in the slider 110, and a threaded portion of the screw hole 112 in the slider 110 is threaded together with the threaded portion on the outer circumferential surface of the guide screw 106. Because of this, when the guide screw 106 is rotated, the slider 110 is guided by the guide case 102, and slides in the longitudinal direction of the guide case 102 and the guide screw 106.

Moreover, one end portion of the wire 70 is anchored to the slider 110. The length of the wire 70 is set such that, when the slider 110 is positioned in its initial position inside the guide case 102, the wire 70 is pulled as a result of the seat cushion 12 reaching a maximum lift position to which it can be lifted towards the vehicle upper side by the lifting device 36. Because of this, in the same way as in the second exemplary embodiment, when the slider 110 is positioned in its initial position inside the guide case 102, then when the seat cushion 12 has been lowered as far as possible towards the vehicle lower side by the lifting device 36, the wire 70 is slack (see FIG. 3).

In this vehicle seat 10, when the distance to an obstacle in front of the vehicle 24 reduces to a predetermined value or less, the motor actuator 104 is operated so that the guide screw 106 is rotated. As a result of this rotation of the guide screw 106, as is shown by the double-dot chain line in FIG. 5, the slider 110 inside the guide case 102 is moved towards the vehicle front side. As a result, the end portion on the slider 110 side of the wire 70 is moved towards the vehicle front side together with the slider 110. In this state, if, for example, the seat cushion 12 has been lowered as far as possible towards the vehicle lower side by the lifting device 36, then the wire 70 is pulled as a result of it being pulled by the slider 110 (i.e., in the state shown by the double-dot chain line in FIG. 3).

In a state in which the wire 70 is being pulled in this way, the pulling load applied to the webbing 60 of the seatbelt device 54 from the body of the vehicle occupant 14 which is starting to make an inertial movement towards the vehicle front side is transmitted to the slider 110 of the pulling device 82 via the tongue 64, the buckle 66, the cushion frame 40 and the wire 70. As a result, when the slider 110 starts to move towards the vehicle rear side, movement towards the vehicle rear side of the slider 110 is restricted by the threaded portion of the screw hole 112 of the slider 110 and the threaded portion of the guide screw 106.

In this way, as a result of movement towards the vehicle rear side of the slider 110 being restricted in this way, the pulling load transmitted from the wire 70 to the slider 110 is transmitted to the guide case 102. The pulling load that is transmitted to the guide case 102 in this way is transmitted to the movable rail 22 on the vehicle left side of the sliding device 18, and is then transmitted from this movable rail 22 to the floor 26 of the vehicle 24 via the guide rails 20.

Because the pulling load applied to the webbing 60 as a result of the vehicle occupant 14 starting to make an inertial movement towards the vehicle front side is transmitted in this way to the floor 26 of the vehicle 24, it is possible to prevent the vehicle seat 10 from being deformed by this type of pulling load, and making any large movement towards the vehicle front side.

In addition, the wire 70 can be pulled taut by the operation of the pulling device 82 without the seat cushion 12 reaching the maximum lift position. Because of this, the above-described pulling load can be transmitted to the floor 26 of the vehicle 24 within a very short time after the vehicle 24 has collided with an object.

Furthermore, in the present exemplary embodiment, the one end portion of the wire 70 is moved by drive force from the motor actuator 104. Because of this, by causing the motor actuator 104 to be driven in reverse, the slider 110 can be restored to its initial position. If the vehicle 24 is able to avoid being in a collision, then by restoring the slider 110 to its initial position, the above-described structure can be used repeatedly.

Additionally, in the present exemplary embodiment, one end portion of the wire 70 is supported by the wire supporting portion 98 of the movable rail 22 on the left side in the vehicle width direction, and the other end portion of the wire 70 is looped around the second anchoring member 74 of the cushion frame 40 of the seat cushion 12. Because of this, there is no need to provide a structure for anchoring the end portions of the wire 70 in the space on the vehicle rear side of this vehicle seat 10. Consequently, the space on the vehicle rear side of this vehicle seat 10 can be put to better practical use.

Fourth Exemplary Embodiment

Figure 6:
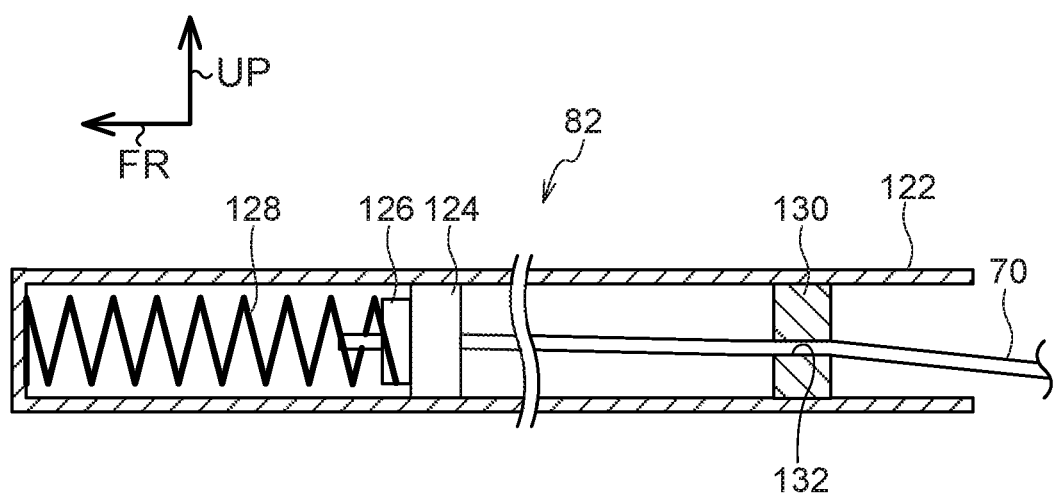
FIG. 6 is a side cross-sectional view showing a pulling device of a vehicle seat according to a fourth exemplary embodiment.

As is shown in FIG. 6, the pulling device 82 of the vehicle seat 10 according to a fourth exemplary embodiment is provided with a cylinder 122. A longitudinal direction of this cylinder 122 extends roughly in the vehicle front-rear direction, and an end portion on the vehicle rear side of the cylinder 122 is open. A piston 124 which serves as a movable member is provided at an inner side of the cylinder 122, and the piston 124 is movable in the longitudinal direction of the cylinder 122 inside the cylinder 122.

A portion at a vehicle front side of the piston 124 is formed as a spring anchor portion 126, and one end of a tension coil spring 128 is anchored to this spring anchor portion 126. Another end of the tension coil spring 128 is anchored to a bottom portion on the vehicle front side of the cylinder 122, and the tension coil spring 128 urges the piston 124 towards the vehicle front side.

The one end portion of the wire 70 is anchored to the piston 124. The other end side of the wire 70 extends to the outside of the cylinder 122 through an aperture end on the vehicle rear side of the cylinder 122. Furthermore, a block-shaped wire stopper 130 is provided in the cylinder 122 at a vehicle rear side of an initial position of the piston 124. A hole portion 132 through which the wire 70 is inserted is formed in the wire stopper 130. The hole portion 132 is offset in an orthogonal direction relative to the longitudinal direction of the cylinder 122 from the anchoring position where the wire 70 is anchored in the piston 124. Because of this, the wire 70 is bent by being pressed against the wire stopper 130 at an edge of the hole portion 132. As a result, when the wire 70 moves in the longitudinal direction thereof, if the wire 70 moves at a slow speed, then the wire 70 moves while rubbing against the edge of the hole portion 132. If, however, the wire 70 moves at a fast speed, the movement of the wire 70 is restricted by friction generated between the wire 70 and the edge of the hole portion 132.

Because of this, when the seat cushion 12 is placed in a lifted state as a result of the lifting device 36 being operated, the piston 124 is moved in the longitudinal direction of the cylinder 122 either by the urging force of the tension coil spring 128, or in resistance to the urging force of the tension coil spring 128 until the wire 70 becomes taut in accordance with the position of the seat cushion 12.

In contrast, in the present exemplary embodiment, the wire 70 is constantly under a state of tension. Because of this, in the event that the vehicle 24 is in a frontal collision, the pulling load that is applied to the webbing 60 of the seatbelt device 54 from the body of the vehicle occupant 14 which is starting to make an inertial movement towards the vehicle front side is transmitted to the wire 70 via the tongue 64, the buckle 66, and the cushion frame 40, and this pulling load starts to pull the wire 70 to the outside of the cylinder 122. The movement speed of the wire 70 in this state is faster than when the movement speed of the wire 70 is caused by the lifting device 36 being operated. Because of this, movement of the wire 70 is restricted by the fiction between the wire 70 and edge of the hole portion 132 in the wire stopper 130.

As a result of the movement of the wire 70 being restricted in this way by the wire stopper 130, the pulling load is transmitted to the movable rail 22 on the vehicle left side of the sliding device 18 via the wire stopper 130 and the cylinder 122, and is then transmitted from this movable rail 22 to the floor 26 of the vehicle 24 via the guide rails 20.

Because the pulling load applied to the webbing 60 as a result of the vehicle occupant 14 starting to make an inertial movement towards the vehicle front side is transmitted in this way to the floor 26 of the vehicle 24, it is possible to prevent the vehicle seat 10 from being deformed by this type of pulling load, and making any large movement towards the vehicle front side.

Additionally, in the present exemplary embodiment, the wire 70 is placed in a constantly taut state by the urging force of the tension coil spring 128. Because of this, the pulling load can be quickly transmitted from the wire 70 to the movable rail 22.

Note that, in the above-described second exemplary embodiment through fourth exemplary embodiment, a structure is employed in which, at the initial positions of the pistons 86 and 124 and the slider 110, which are movable members, if the seat cushion 12 reaches the maximum lift position to which it can be lifted by the lifting device 36, the wire 70 is taut.

However, in this state it is also possible for the wire 70 to be slack.

Fifth Exemplary Embodiment

Figure 7:
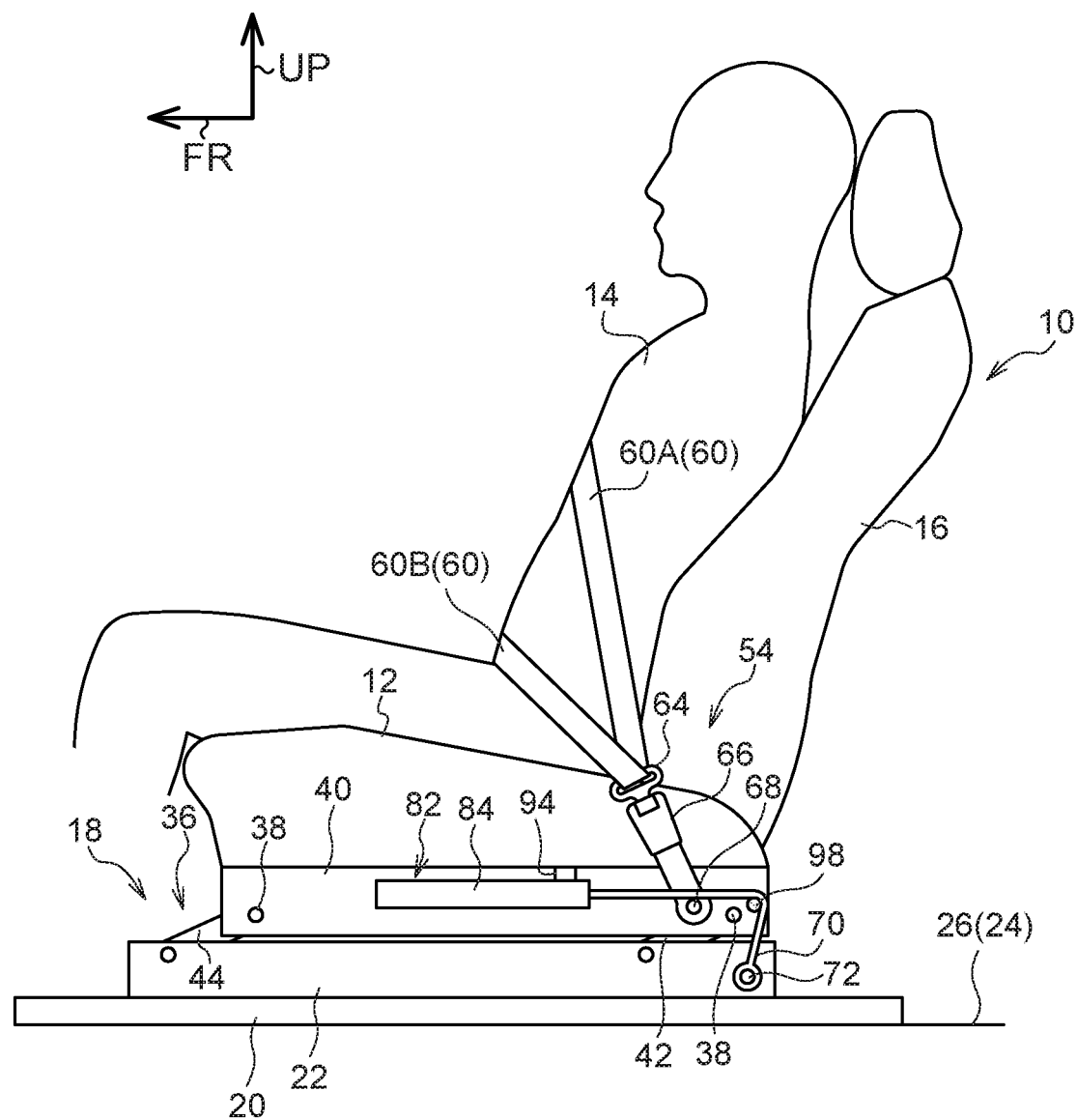
FIG. 7 is a side view of a vehicle seat according to a fifth exemplary embodiment.

As is shown in FIG. 7, the cylinder 84 of the pulling device 82 of the vehicle seat 10 according to a fifth exemplary embodiment is attached to the cushion frame 40 of the seat cushion 12, and the other end portion of the wire 70 is anchored to the piston 86 (not shown in FIG. 7) inside the cylinder 84.

In the present exemplary embodiment having this type of structure, in the event of a vehicle collision, the pulling load that is applied to the webbing 60 from the body of the vehicle occupant 14 is transmitted to the cylinder 84 of the pulling device 82 via the tongue 64, the buckle 66, and the cushion frame 40. The pulling load transmitted to the cylinder 84 is then transmitted to the movable rail 22 on the vehicle left side of the sliding device 18 via the piston 86 and the wire 70, and is then transmitted from this movable rail 22 to the floor 26 of the vehicle 24 via the guide rails 20.

In this way, although the pulling load is transmitted by a different route, the present exemplary embodiment exhibits fundamentally the same type of actions as the above-described second exemplary embodiment, and it is possible to obtain the same type of effects as those obtained from the second exemplary embodiment.

Note that the present exemplary embodiment employs a structure in which the pulling device 82 of the second exemplary embodiment is attached to the cushion frame 40. However, it is also possible to employ a structure in which the pulling device 82 of the third exemplary embodiment or the pulling device 82 of the fourth exemplary embodiment is attached to the cushion frame 40.

Sixth Exemplary Embodiment

Figure 8:
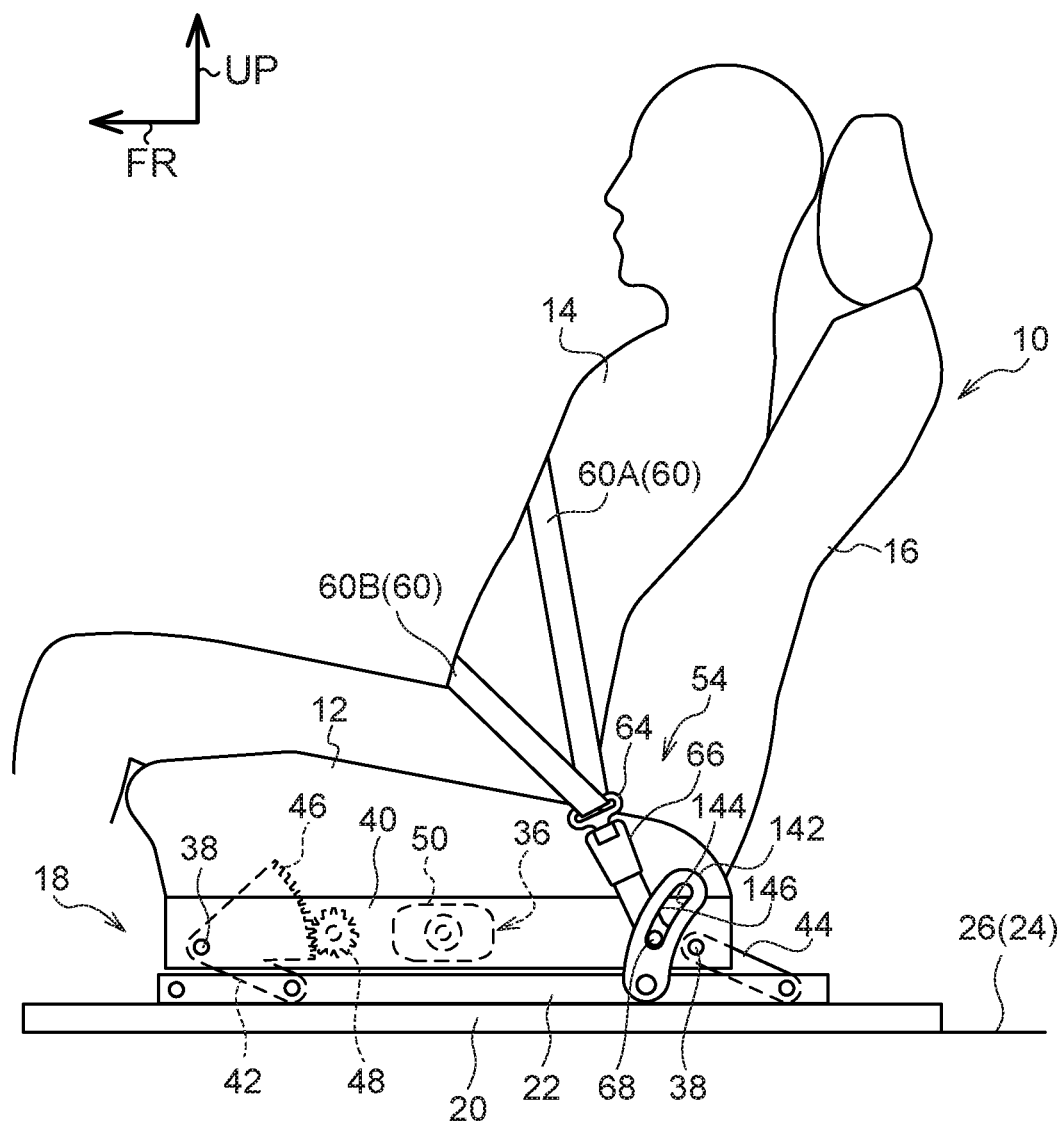
FIG. 8 is a side view of a vehicle seat according to a sixth exemplary embodiment.

As is shown in FIG. 8, in the lifting device 36 of the vehicle seat 10 according to a sixth exemplary embodiment, the driving link 42 is supported by the rod 38 provided at the vehicle front side of the cushion frame 40 so as to be freely rotatable around this rod 38, and the driven link 44 on the left side in the vehicle width direction of the vehicle seat 10 is supported by the rod 38 provided at the vehicle rear side of the cushion frame 40 so as to be freely rotatable around this rod 38. In the lifting device 36 of the present exemplary embodiment, when join portions where the driving link 42 and the driven link 44 are joined to the rods 38 are pivoted towards the vehicle rear-upper side by driving force from the lift motor 50, the cushion frame 40 is pivoted towards the vehicle rear-upper side. In contrast to this, when join portions where the driving link 42 and the driven link 44 are joined to the rods 38 are pivoted towards the vehicle front-lower side by driving force from the lift motor 50, the cushion frame 40 is pivoted towards the vehicle front-lower side. In this way, the seat cushion 12 is lifted and lowered.

In addition, this vehicle seat 10 is also provided with a plate 142 which serves as a load transmitting member. The plate 142 is formed in a plate shape, and a thickness direction of the plate 142 extends in the vehicle width direction. A vehicle lower-side end portion of the plate 142 is fixed to the movable rail 22 of the sliding device 18. A circular arc-shaped elongated opening 144 which serves as a opening portion is formed in the plate 142. The elongated opening 144 is formed so as to be concentrically centered on the join portion where the driven link 44 provided at the vehicle rear side of the movable rail 22 on the vehicle left side is joined to the movable rail 22.

Figure 9:
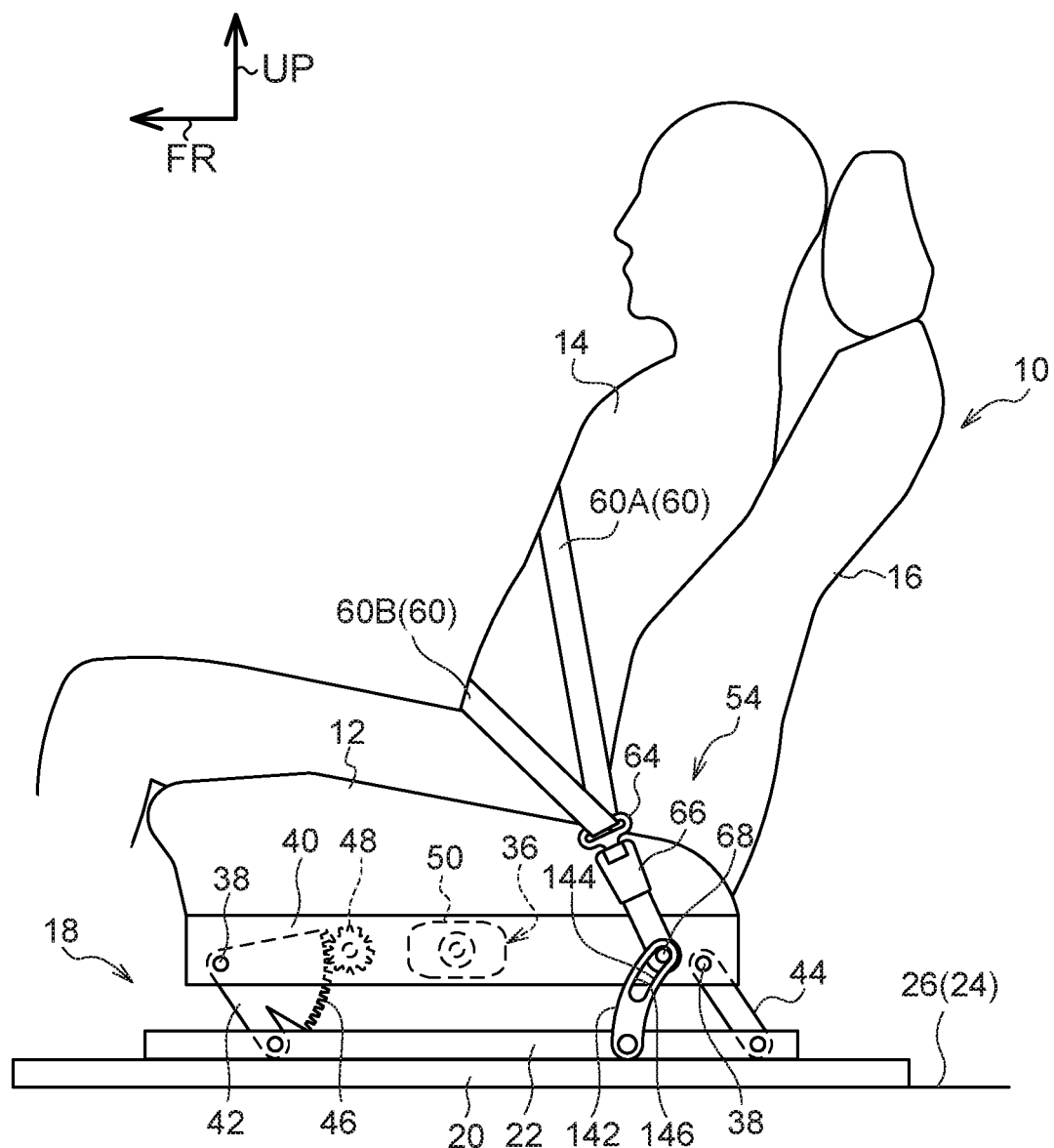
FIG. 9 is a side view corresponding to FIG. 8 showing a state in which a seat cushion has been lifted to a maximum lift position by a lifting device.

Furthermore, in the present exemplary embodiment, the fastening member 68 is formed by a stepped bolt or the like that has a circular column-shaped step portion formed between a fastening portion such as a thread portion or the like and a head portion. An internal width dimension of the elongated opening 144 is slightly larger than an outer diameter dimension of the step portion of the fastening member 68, and the step portion of the fastening member 68 is inserted inside the elongated opening 144. As is described above, the elongated opening 144 is formed so as to be concentrically centered on the join portion where the driven link 44 provided at the vehicle rear side of the movable rail 22 on the vehicle left side is joined to the movable rail 22. Because of this, as is shown in FIG. 8 and FIG. 9, even if the buckle 66 is pivoted relative to the movable rail 22 by an operation of the lifting device 36, the step portion of the fastening member 68 is movable inside the elongated opening 144. A portion on the vehicle front side of the inner circumferential portion of the elongated opening 144 forms a load-receiving portion 146. When the buckle 66 performs a relative movement towards the vehicle front side relative to the plate 142, the step portion of the fastening member 68 abuts against the load-receiving portion 146 of the elongated opening 144, so that the load-receiving portion 146 is pressed by the step portion of the fastening member 68.

If the vehicle 24 is in a frontal collision, when a pulling load is imparted to the webbing 60 from the body of a vehicle occupant 14 which is starting to make an inertial movement towards the vehicle front side, this pulling load is transmitted to the buckle 66 via the tongue 64, and starts to move the buckle 66 towards the vehicle front side. When the buckle 66 is moved by this pulling load, the step portion of the fastening member 68 abuts against the load receiving member 146 of the elongated opening 144 in the plate 142. Consequently, the load receiving member 146 is pressed towards the vehicle front side by the step portion of the fastening member 68 and, as a result of this, the pulling load transmitted from the webbing 60 to the buckle 66 is transmitted to the plate 142.

Because the plate 142 is fixed to the movable rail 22 on the vehicle left side of the sliding device 18, the pulling load transmitted to the plate 142 is transmitted to the movable rail 22, and from there is transmitted to the floor 26 of the vehicle 24 via the guide rails 20 of the sliding device 18. Because the pulling load applied to the webbing 60 as a result of the vehicle occupant 14 starting to make an inertial movement towards the vehicle front side can be transmitted in this way to the floor 26 of the vehicle 24, it is possible to prevent the vehicle seat 10 from being deformed by this type of pulling load, and making any large movement towards the vehicle front side.

Moreover, in the present exemplary embodiment, the plate 142 is attached to the movable rail 22 of the sliding device 18 so that there is no need to provide a structure for transmitting the pulling load to the floor 26 of the vehicle 24 in the space on the vehicle rear side of this vehicle seat 10. Consequently, the space on the vehicle rear side of this vehicle seat 10 can be put to better practical use.

Furthermore, the load-receiving portion 146 is formed by a portion of the inner circumferential portion of the elongated opening 144 formed in the plate 142. Because of this, a portion forming the plate 142 also exists in a portion of the inner circumferential portion of the elongated opening 144 located opposite the load-receiving portion 146. Because of this, when the load-receiving portion 146 is pressed by the step portion of the fastening member 68 so that the pulling load is transmitted to the load-receiving portion 146, this pulling load is also transmitted to the portion of the inner circumferential portion of the elongated opening 144 located opposite the load-receiving portion 146. As a consequence, the pulling load is also supported by this portion as well. Because of this, the strength of the plate 142 against the pulling load is increased.

Seventh Exemplary Embodiment

Figure 10:
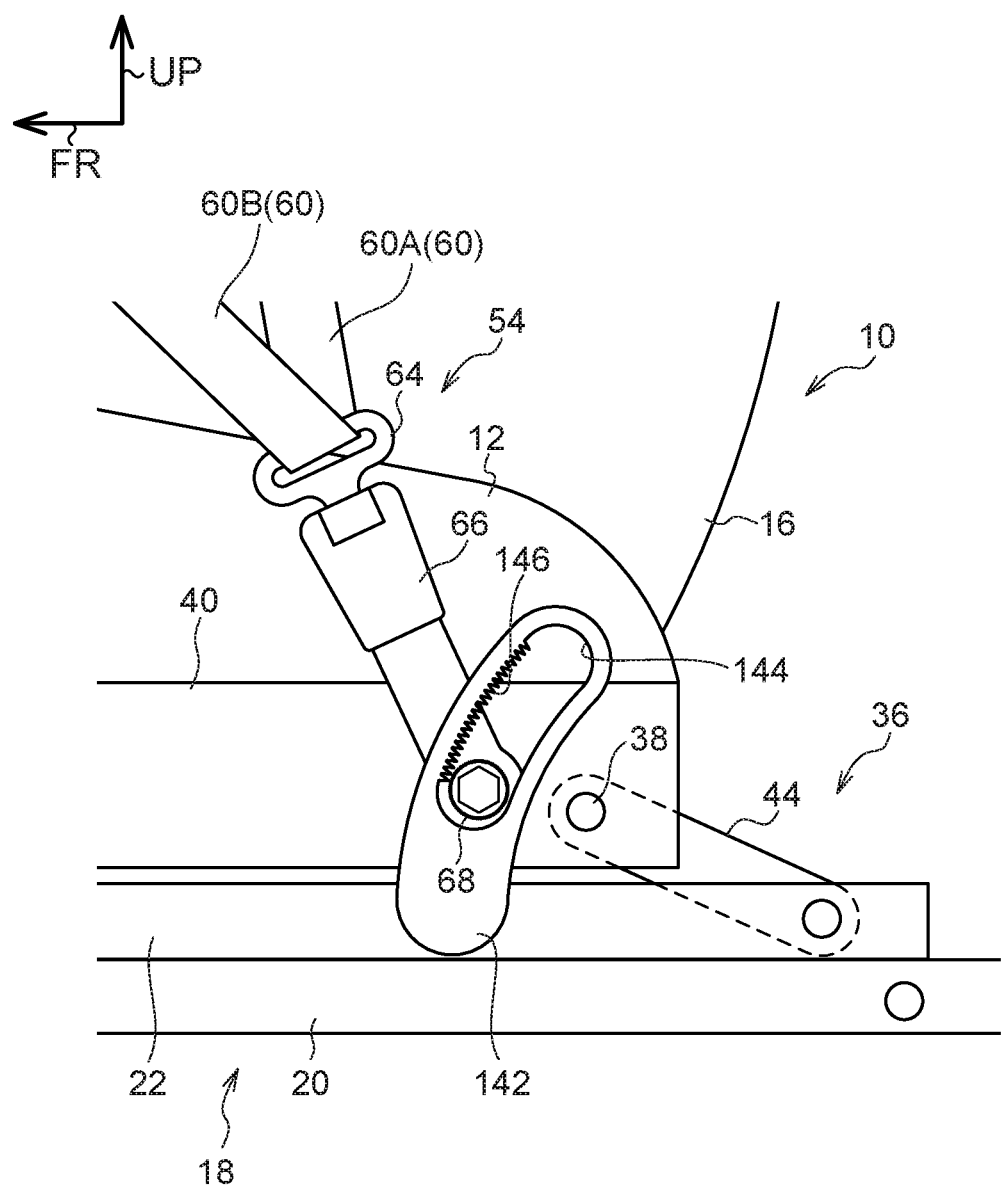
FIG. 10 is a side view showing an enlargement of an installation portion of a plate in a vehicle seat according to a seventh exemplary embodiment.

As is shown in FIG. 10, in a vehicle seat 10 according to a seventh exemplary embodiment, the load-receiving portion 146 of the elongated opening 144 in the plate 142 is formed in a waveform configuration (i.e., in a saw tooth configuration) in which a row of jagged teeth are provided extending in the longitudinal direction of the elongated opening 144. In addition, knurling processing is performed on the outer circumferential portion of the step portion of the fastening member 68. Because of this, in the present exemplary embodiment, when the step portion of the fastening member 68 abuts against the load-receiving portion 146, the jagged teeth of the load-receiving portion 146 mesh with the jagged teeth on the outer circumferential surface of the step portion of the fastening member. As a result, when the step portion of the fastening member 68 presses against the load-receiving portion 146 of the elongated opening 144 in the plate 142, the step portion of the fastening member 68 can be prevented from slipping in the longitudinal direction of the elongated opening 144. As a consequence, the pulling load received by the webbing 60 of the seatbelt device 54 from the body of the vehicle occupant 14 can be efficiently transmitted to the plate 142 from the step portion of the fastening member 68.

Eighth Exemplary Embodiment

Figure 11:
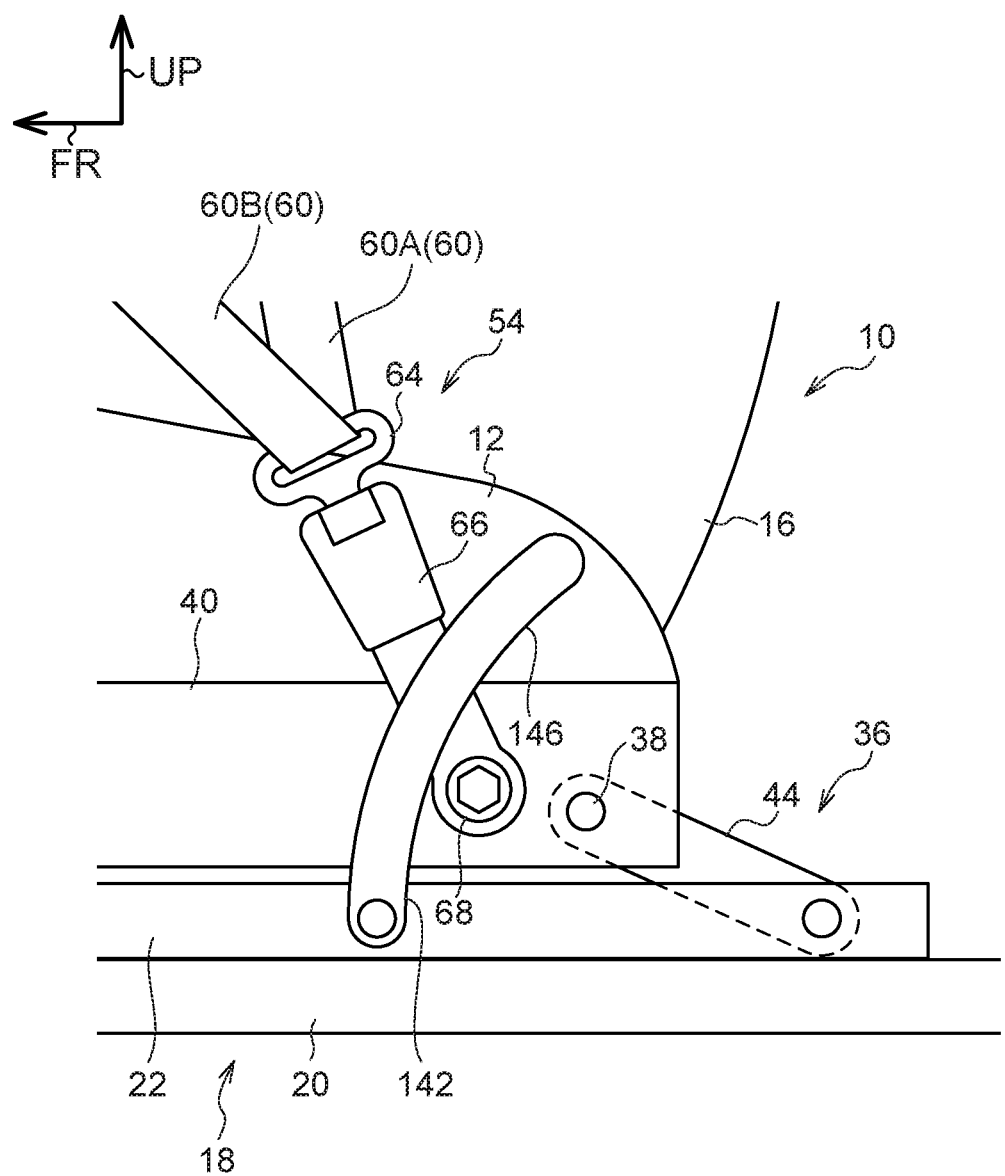
FIG. 11 is a side view showing an enlargement of an installation portion of a plate in a vehicle seat according to an eighth exemplary embodiment.

As is shown in FIG. 11, in a vehicle seat 10 according to an eighth exemplary embodiment, the load-receiving portion 146 is formed by an end portion on the vehicle rear side of the plate 142 which is located opposite the step portion of the fastening member 68. In this way, in the present exemplary embodiment, because the elongated opening 144 is not formed in the plate 142, the plate 142 can be formed having a narrower width compared to the plates 142 of the sixth exemplary embodiment and the seventh exemplary embodiment. Because of this, the plate 142 can be provided even in a structure having little spatial flexibility around the vicinity of the end portion on the vehicle rear side of the guide rail 20 on the left side in the vehicle width direction of the sliding device 18.

Exemplary embodiments of the present disclosure have been described above, however, the present disclosure is not limited to these. Various modifications and the like may be made to the present disclosure insofar as they do not depart from the spirit or scope of the present disclosure.

What is claimed is:

1. A vehicle seat, comprising:
   a seat main body configured to seat a vehicle occupant;
   a buckle that is joined to the seat main body, and that is configured to hold a tongue provided at a webbing of a seatbelt device, thereby effecting a state in which the webbing is fitted relative to a body of the vehicle occupant;
   a base member that is provided at a vehicle lower side of the seat main body, and that is joined to a vehicle body of a vehicle so as to be movable in a vehicle front-rear direction relative to the vehicle body;
   a lifting device that lifts the seat main body relative to the base member by pivoting the seat main body toward a vehicle front-upper side of the vehicle relative to the base member; and
   a load transmitting member that is flexible, that is joined to both the base member and the seat main body, and that becomes tensioned in a straight line toward the vehicle front-upper side when the seat main body is placed in a lifted state by the lifting device.

2. The vehicle seat according to claim 1, wherein a join portion, at which the load transmitting member is joined to at least one of the seat main body or the base member, is rotatable relative to a side at which the seat main body or the base member is joined.

3. The vehicle seat according to claim 1, wherein the lifting device comprises:
- a lift motor;
- a pinion that is joined to an output shaft of the lift motor;
- a driving link that is supported so as to be freely rotatable on the seat main body and the base member, and at which is formed a sector gear that meshes with the pinion; and
- a driven link that is supported so as to be freely rotatable on the seat main body and the base member, and that is rotated subserviently to the driving link.

4. The vehicle seat according to claim 2, wherein a first end portion of the load transmitting member is formed in a ring shape and looped around a first anchoring member, and an opposite second end portion of the load transmitting member is formed in a ring shape and looped around a second anchoring member.

5. The vehicle seat according to claim 1, wherein a first end portion of the load transmitting member is joined to the seat main body and located further forward in the front-rear direction than an opposite second end portion of the load transmitting member joined to the base member.

* * * * *